Figure 1:
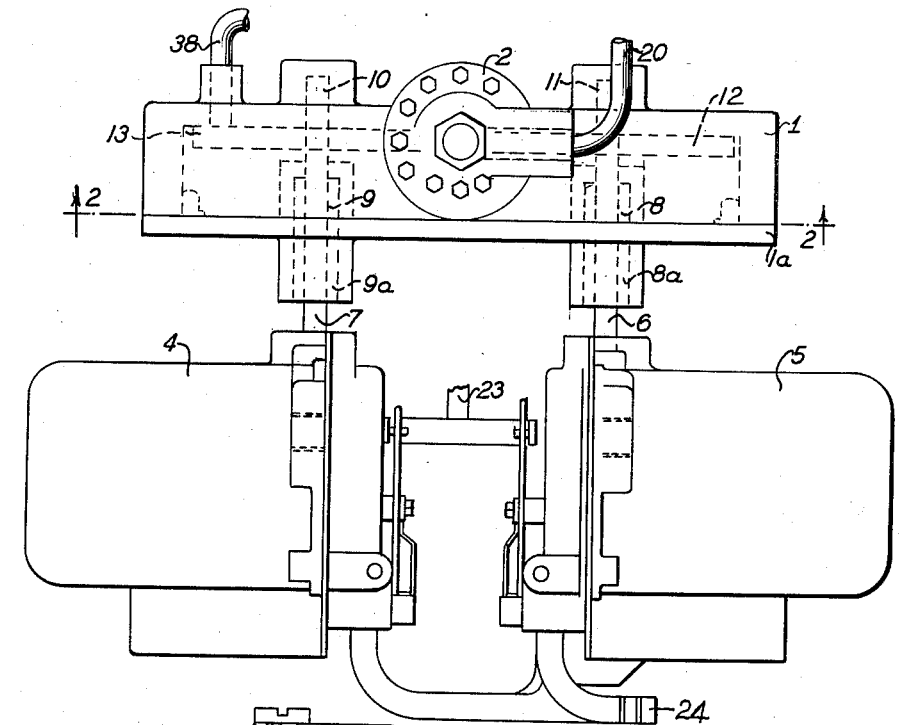

Feb. 14, 1956 F. A. HILL, 2ND 2,734,353
REFRIGERATING DEVICE FOR AUTOMOBILES
Filed April 28, 1953 2 Sheets-Sheet 1

INVENTOR
FRANCIS A. HILL, 2ND
By Young, Emery & Thompson
ATTORNEYS

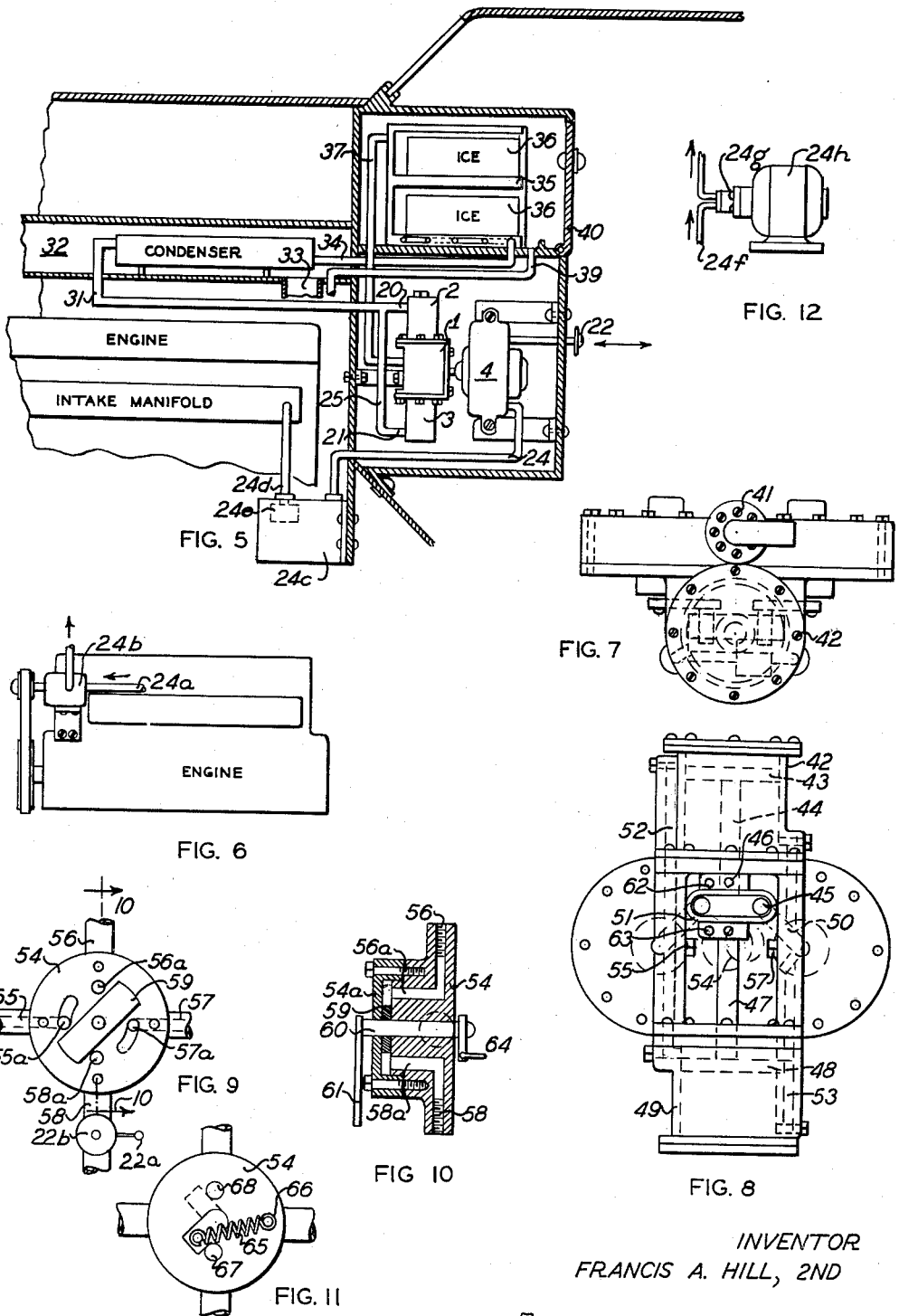

United States Patent Office 2,734,353
Patented Feb. 14, 1956

2,734,353
REFRIGERATING DEVICE FOR AUTOMOBILES
Francis A. Hill 2nd, Westport, Conn.
Application April 28, 1953, Serial No. 351,580
12 Claims. (Cl. 62—117.1)

My invention relates to an ice making device for automobiles and other vehicles driven by or using internal combustion engines and the like.

It is an object of the invention to side step expense in the manufacture of an ice making unit involving an electric motor, high speed rotation, rapid reciprocating piston compressors and units like those in use in a house refrigerator or house air conditioning apparatus.

First, my invention avoids the use of electricity.

Second, by having slow moving parts, the compressor and the motor can be die cast and made cheaper.

Third, my source of power consists in using the vacuum created by the internal combustion engine to operate an air motor, which in turn drives my refrigerating compressor.

Fourth, by having my compressor of small cubic capacity and that of a vacuum motor of relatively large capacity, I can offset whatever theoretical inefficiency there might be in the vacuum motor-small compressor combination.

My invention aims at supplying 8 to 10 cubes of ice so that after a few hours' travel this ice may become available.

As the automobile art has progressed the engines have become more powerful. In becoming more powerful, automotive engineers have increased the suction or vacuum in the intake manifold to the cylinders. This has been such a gradual process that the power potential for auxiliary services in an automobile has been largely overlooked. In this art of refrigeration for automobiles, efforts have been made to extract heat by virtue of low vacuum and temperature while vaporizing gasoline. While these ideas have merit from the refrigeration standpoint, they have failed because they upset the combustible mixture for the engine cylinder. If an engine can't run at a crucial moment no amount of refrigeration is worthwhile.

My invention makes use of the vacuum—but never at the expense of engine power. It is known that the windshield wiper stops when one "steps on the gas," and so the refrigeration motor will stop also. It will only work constantly at steady motor speeds.

It is therefore a further object of my invention to provide a structure such that the safety factor of excess motive power in an automobile engine is automatically maintained at all times.

Figure 2:
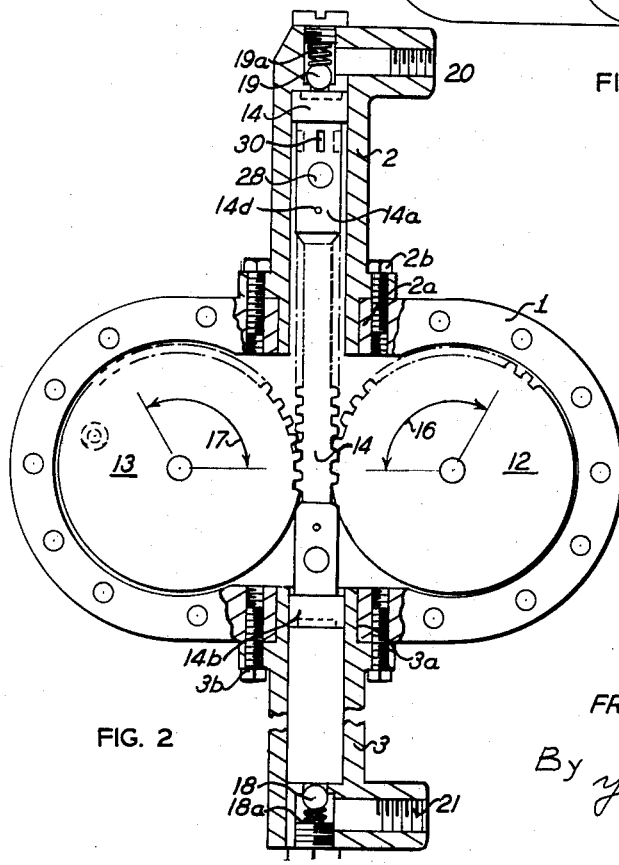
Figure 3:
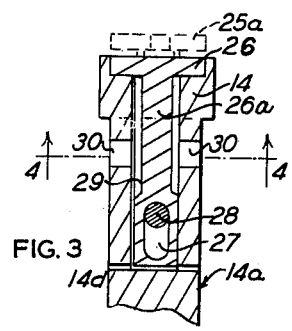
Figure 4:
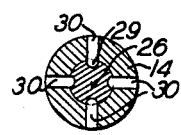

Referring to the drawings:

Fig. 1 is a plan view of a compressor driven by two vacuum motors,

Fig. 2 is a sectional view taken on line 2—2 of Fig. 1 with the gear box cover removed, Fig. 3 is a sectional view of a piston detail on an enlarged scale, Fig. 4 is a cross-section taken on line 4—4 of Fig. 3, Fig. 5 is a diagrammatic view of the refrigeration unit mounted in an automobile, Fig. 6 is a diagrammatic view of an automobile engine driving a vacuum pump to produce suction to drive the vacuum motor, Fig. 7 is a plan view of a large vacuum operated motor of the cylindrical piston-cylinder type driving a small compressor, Fig. 8 is a front elevation of the structure of Fig. 7, Fig. 9 is a side view of an enlarged control valve detail, Fig. 10 is a section taken on line 10—10 of Fig. 9, Fig. 11 is a rear elevation of Fig. 9, and Fig. 12 is a side view showing an electric motor with a small vacuum pump driven thereby.

In Figs. 1 and 2 a gear case 1 is shown with piston cylinders 2 and 3 on opposite sides.

The two "windshield wiper" motors 4 and 5 of a well-known type have shafts 6 and 7 which pass through a cover 1a and stuffing boxes 8 and 9 and are preferably journaled at their ends at 10 and 11. The shafts 6 and 7 may also be journaled in the cover 1a at 8a and 9a, Fig. 1. On the shafts 6 and 7 are rigidly mounted gears 12 and 13 which engage teeth on each side of a piston 14 as shown. "Oilite" bearing bushings may be used.

As the wiper motors 4 and 5 swing back and forth the gears 12 and 13 turn back and forth through their arcs of rotation indicated by arrows 16 and 17. The piston 14 is moved up and down and on the up stroke the piston compresses and expels refrigerant gas in cylinder 2 and sucks it into the cylinder 3 from inside the gear case 1. On the down stroke gas is sucked into cylinder 2 and compressed and expelled from cylinder 3.

It is preferred to have opposed pistons and cylinders. By having the cylinders mounted as shown and seats 2a and 3a reamed straight through from one side of the casing 1 to the other, perfect alignment can be cheaply produced and manufactured. The cylinders may be bolted to casing 1 by bolts 2b and 3b.

It is preferred to provide rotating shafts to reciprocating shafts since the shaft sealing problem is much simpler. By having the compressor piston driven by gears engaging rack-teeth on opposite sides, the shaft alignment through the stuffing box is maintained. When only one vacuum motor is used for power either one of the gears 12 or 13 may be replaced by a plain wheel or by a stationary semi-spherical bearing to offset side thrust from the driving gear. However, for the sake of extra power it is preferred that the construction be used as shown in the drawings.

Each cylinder is the duplicate of the other and so lends itself to cheap high speed production.

In order to have each compressor as efficient as possible it is preferred to have a minimum of clearance between the top of the piston and the head end of the cylinder with discharge check valves 18 and 19.

Discharge passageways 20 and 21 are provided which may be connected together by conduit 25, Fig. 5.

Fig. 5 shows a diagrammatic lay-out of the refrigerating unit and while this unit has been shown as located in what is known as the "glove compartment" of an automobile, it is obvious that it may be located in any other readily accessible position anywhere in or on the vehicle.

In Fig. 5 the vacuum motor is turned on and off by a control lever 22 connected to a vacuum motor valve mechanism 23, Fig. 1. By pushing lever 22 in or out the wiper motor valve mechanism 23 will be closed or opened so that the vacuum in the intake manifold may operate the wiper motors through a pipe 24.

Springs 18a and 19a hold the ball check valves 18 and 19 tight when the pistons 14 or 14b are sucking gas in from the casing 1.

Fig. 3 shows an enlarged detail of one of the ends of the pistons 14 or 14b having a slidably mounted valve plate 26 and a stem 26a, the latter having an elongated slot 27. A pin 28 limits the end travel of the valve plate and stem, and the valve plate 26 should be "lapped" to its seat but free around its edge so that the reciprocating motion of the piston combined with its own inertia will open and close it. A hole 14d prevents gas pressure from building up under the stem 26a. The stem 26a may have longitudinal grooves 29 cooperating with elongated slots or holes 30 so that the gas may pass from around the gears 13 and 14 along the piston shank 14a and through the valve when in its open position as indicated at 25a in dotted lines.

When using "F$_{12}$" as a refrigerant the minimum pressure in the casing 1 is about 29 lbs. per sq. in. so that in addition to the mechanical forces tending to open this piston valve, there is a pressure on the under side of the piston valve tending to open it during the suction stroke. When each cylinder is full of this low pressure gas, this pressure is equalized on each side of the valve, and it is then free to close when the compression stroke is started. As compression increases within a cylinder the valve seats itself more and more firmly.

Referring to Fig. 5, compressed "F$_{12}$" (and a small amount of mineral oil for lubrication) is discharged through conduits 20, 21, 25 and 31 to the condenser which may be located in a cooling air duct 32 which may have a rear air outlet 33. The forward motion of the car supplies the cooling air. From the condenser 32 condensed liquid refrigerant flows through conduit 34 to the evaporator or ice unit 35 holding the ice trays 36. From the evaporator the refrigerant is sucked through conduit 37 to an intake 38 of the gear case 1. This completes the cycle. The ice compartment may have a drain pipe 39 for moisture. Access to the ice trays 36 may be through a hinged door 40. The evaporator contains of course, the expansion valve or tube.

My vacuum power system is operated by air at atmospheric pressure, and being at atmospheric pressure the air is never hotter than the atmosphere. This avoids many mechanical and lubrication troubles and is an important factor in the design of a low-priced trouble-free motor-compressor unit.

Fig. 7 shows a plan view of the compressor unit driven by two opposed cylindrical piston motors instead of those of the type shown in Fig. 1. The upper compressor cylinder is shown at 41, and an upper vacuum motor cylinder 42 has a piston 43, Fig. 8, with piston rod 44 fastened at its lower end in a link 45 and held therein by a pin 46. The opposite or lower side of the link 45 has the upper end of a lower piston rod 47 similarly pinned in position. The rod 47 drives a piston 48 up and down in a lower power cylinder 49.

The link 45 engages two crank arms 50 and 51 upon which are mounted gears similar to 12 and 13 of Fig. 2. The up and down motion of the pistons, piston rods, and link 45 swings the crank arms and turns the gears and makes the latter swing back and forth as described for Fig. 2.

The upper ends of cylinders 42 and 49 are connected together by a passage way 52, and the lower ends of cylinders 42 and 49 are connected together by a passageway 53.

Thus the upper sides of both pistons may be connected to the vacuum suction and the lower sides to atmospheric pressure at the same time and vice versa as described below.

Between these two passageways 52 and 53, I prefer to locate an automatic control valve 54. The location of this valve is indicated in Fig. 8 by the dotted circle 54 (so that this figure can clearly show the piston and link construction).

Fig. 9 shows a face view of the valve 54 with a cover 54a removed. A valve plate 59 swings back and forth through an arc of approximately 90°, and when the valve plate 59 is in the position shown and the vacuum suction from the engine is connected to pipe 56, the suction is transmitted through passageway 56a, 55a, and pipe 55 to the passageway 52 to the upper end of both cylinders 42 and 49. Air is admitted through the shut-off valve 22b, passageways 58, 58a, 57a, 57 and 53, to the lower side of the pistons, thus applying power to the upstroke. Turning the valve reverses this action.

The valve plate 59 is rigidly fixed to the shaft 60, Fig. 10, on the left end of which is mounted a lever 61. Two projecting pins 62 and 63 on link 45 engage this lever 61 and swing the shaft and valve plate 59 back and forth.

On the opposite end of the shaft 60 is a lever 64 and between the end of the lever and a pin 66, Fig. 11, is mounted a spring 65 under tension. After the lever 61 is swung past the half way mark by one of the pins 62 or 63 on the link 45, the spring suddenly flops the valve to its other position and reverses the vacuum and atmospheric pressure to the opposite sides of the two pistons. Stops 67 and 68 limit the range of action of the valve plate.

The suction power from the engine may be shut on and off by the valve 22b operated by the hand control lever 22a similar to 22 in Fig. 1.

The average vacuum in the intake manifold of an automobile, at full speed, is 18 in. of mercury, or about 8.8 lbs. pressure per square inch.

If a windshield wiper motor is used and the piston in it has an area of 2.6 in.$^2$ (1¾" x 1½") then the total pressure on the piston is (8.8 x 2.6) equals 22.8 lbs., with two wiper motors working together, the driving force being 45.6 lbs.

A compressor piston of $\frac{7}{16}$ inch in diameter has an area of .15 in.$^2$, when using a refrigerant like "F$_{12}$" (Freon) the pressure range is from 26.51 lbs./in.$^2$ abs. at 5° F. to 114.3 lbs./in.$^2$ abs. at 90° F. or about 88 lbs./in.$^2$ differential. Therefore, the maximum pressure on the piston is .15 x 88 lbs./in.$^2$ or 13.2 lbs.

It is obvious that the driving force of 45.6 lbs. will overcome the 13.2 lbs. compressor resistance with enough reserve power to take care of inefficiencies, such as stuffing box resistance, mechanical friction and the like.

If the compressor has (for example), a piston of $\frac{7}{16}$" in diameter and a 1¾" stroke, the volume per stroke is .13 cu. in. At 50 strokes per minute, the volume handled is 26.25 cu. in. per minute for both pistons.

Calculations show that about 28 B. t. u. have to be extracted from water at room temperature to make 10 ice cubes, each cube measuring ¾" x ¾" x ¾".

Data from Kenetic Chemicals Inc. Technical Paper No. 10 shows that under standard ton conditions, (200 B. t. u. per minute) a compressor using "F$_{12}$" has a displacement of 5.56 cu. ft. per minute. Using this data and allowing one hour to extract the above 28 B. t. u. to make ice, we find we need a compressor with a capacity of approximately 21 cu. in. per minute, while the above $\frac{7}{16}$" diameter compressor has a capacity of 26.25 cu. in. per minute.

So my compressor-vacuum motor combination has a reserve power of 45.6 lbs—13.2 lbs. equals 32.4 lbs. and a reserve heat capacity of 26.25 cu. in/min.—21 cu. in./min. equals 5 cu. in./min. or 300 cu. in./hour. These reserves are sufficient to overcome inefficiencies inherent in such small compressor and ice making units.

Fig. 6 shows a rotary vacuum pump 24b mounted on the side of an engine and driven by a V belt from the lower engine V pulley. In this case the vacuum created by the pump connects through pipe 24a with the vacuum motor. In some applications this may be preferable, especially when higher power is needed. A good vacuum motor of the type shown in Patent No. 2,601,397 may be used to maintain a vacuum of 28–29 inches of mercury even when cheaply made. This high vacuum equals approximately 14 lbs. per sq. in. instead of the 8.8 lbs. per sq. in. mentioned above. The driving power for the refrigerating unit would then be 36 pounds for each vacuum motor or 72 pounds instead of the 45.6 lbs. mentioned. With this added power the unit could then be used in air conditioning an automobile and the parts would still be cheap and sell at relatively low prices.

Since an automobile does not provide ideal conditions for making ice we can assume that the compressor will have about 30% to 50% efficiency and the time for making the ice will vary between one and two hours.

While driving, my unit will make 40–60 cubes of ice. By putting some of these cubes in a thermos ice bucket, an ample supply of ice can be made.

As mentioned above, the refrigerating unit will stop when the driver steps on the gas. This stepping on the gas rarely lasts more than 30 to 60 seconds (while the driver is passing another car or is starting up). This stopping of the vacuum motor or motors can be largely overcome without in the least affecting engine performance by using a vacuum accumulator consisting of a tank 24c (Fig. 5) connected in the pipe line 24 from the vacuum motor to the intake manifold. With this construction the pipe 2 leads into the tank 24c and the pipe 24d leads from the tank to the intake manifold of the engine. There may be a check valve 24e in or at the end of the pipe 24d to help hold the vacuum. A tank 5"×5"×10" has enough volume to keep a pair of windshield wiper motors going from half a minute to one minute.

Another way to drive the vacuum motors is shown in Fig. 12, where a vacuum pump 24g is driven by an electric motor 24h. The intake 24f of the pump would be connected to the discharges of the vacuum motor or motors, and thus the vacuum accumulator would not be necessary. A tenth horsepower electric motor driving a small Rotoid compressor with gears 1 inch in diameter and ¼ to ⅜ inch thick will keep the vacuum motors running.

My invention can be used in motor boats, auxiliary yachts, camps with portable lighting systems, in trucks to cool streams of air directed on the driver (as in commercial air liners), and for many other uses.

While I have shown a preferred construction I do not limit my invention to its details. One compression cylinder and one power cylinder may be used, or two compression cylinders and one power cylinder, or one power cylinder and two compression cylinders. Also rotary compressors and rotary motors may be used.

My invention may be used with supercharged internal combustion engines by connecting the discharge conduit of the motor to the air stream entering the supercharger in the region of highest suction.

My invention can be used on trucks, tanks, landing craft, yachts, aeroplanes, and in diesel power plants where small ice making and cooling units are needed for better living.

Broadly, my invention consists in utilizing the vacuum suction created by an engine or its supercharger for supplying power for compression.

What I claim is:

1. A cooling and refrigeration apparatus comprising a casing, a pair of compressors mounted one on each side of said casing and having intake and discharge ports, a piston and piston rod interconnecting the said compressors, teeth on each side of said rod, gears on each side of said rod engaging said teeth, a shaft for each of said gears and rigidly attached thereto, bearings and stuffing boxes for each of said shafts, two vacuum motors one driving one shaft and the other driving the other shaft, said motors having their intake ports connected to the atmosphere and their discharge ports connected to an intake side of an internal combustion engine, and control means to stop and start said motors.

2. A cooling and refrigeration apparatus according to claim 1 in which said motors are of the windshield wiper type.

3. A cooling and refrigeration apparatus according to claim 1 in which each of said compressors have a check valve and discharge port at the head end of its cylinder, and an intake port consisting of a valve in the end of each piston, passageways along the sides of said piston and into said valve so that gas can flow during the suction stroke from said casing through said valve into said cylinder for compression, an inlet to said casing, and an automatic valve to reverse the action of said motors to cause reciprocation of said rod and said pistons.

4. A cooling and refrigeration apparatus according to claim 1 in which said motors are of the cylindrical piston and cylinder type, intake and discharge ports for said cylinders, pistons and piston rods being connected together by a link engaging a crank on each of said shafts for said gears, and an automatic valve to reverse the action of said motors at the end of each stroke.

5. A cooling and refrigeration apparatus according to claim 1 in which said compressor forms a part of an ice making or cooling unit.

6. A cooling and refrigeration apparatus according to claim 1, in which said motors are of the cylindrical piston and cylinder type, intake and discharge ports for said cylinders, pistons and piston rods connected together through a link engaging a crank on each of said shafts for said gears, an automatic valve to reverse the action of said motors at the end of each stroke, the discharge ports of said motors being connected to the intake side of an internal combustion engine, and having said compressors connected to a part of an ice making or cooling unit, and means to start and stop said motors.

7. A cooling and refrigeration apparatus according to claim 1, in which each of said pistons is interconnected by its respective piston rod to maintain each piston in alignment in its cylinder.

8. A cooling and refrigeration apparatus according to claim 1 in which said motors are of the cylindrical piston and cylinder type with intake and discharge ports for said cylinders, the pistons and piston rods being rigidly connected together so that each piston maintains the opposite piston in alignment in its cylinder and in which an automatic valve is provided to reverse the action of said motors at the end of each stroke.

9. A cooling and refrigeration apparatus according to claim 1, in which a condenser is provided and which is cooled by air flowing past the vehicle in which said engine is provided.

10. A cooling and refrigerating apparatus comprising a casing, a pair of compressors one mounted on each side of said casing and having intake and discharge ports, a piston and piston rod interconnecting said compressors, teeth on one side of said rod, a gear on one side of said rod and engaging said teeth, a shaft rigidly attached to said gears, at least one bearing for said shaft, a stuffing box for said shaft, a vacuum motor driving said shaft having its intake port connected to the atmosphere and its discharge port connected to the intake side of an internal combustion engine, and control means to start and stop said motor.

11. A cooling and refrigeration apparatus according to claim 10, in which each of said pistons is interconnected by its respective piston rod to maintain each piston in alignment in its cylinder.

12. A cooling and refrigerating apparatus comprising a casing, compressors having cylinders mounted on each side of said casing, intake and discharge ports for said cylinders, a piston in each of said cylinders having an enlarged portion adapted to move freely in its cylinder and to maintain the opposite piston in alignment in its cylinder, said intake ports consisting of a valve plate with a stem inside said pistons, means to limit the motion of said valve plate and stem with relation to said pistons, passageways around and thru said pistons acting as conduits from the interior of said casing to the compression region in said cylinders, at least one vacuum motor to drive said compressors, and means to start and stop said motor.

References Cited in the file of this patent

UNITED STATES PATENTS

| | | |
|---|---|---|
| 1,403,290 | Catching | Jan. 10, 1922 |
| 1,694,279 | Oishei | Dec. 4, 1928 |
| 1,797,977 | Folberth et al. | Mar. 24, 1931 |
| 2,070,379 | Stramaglia | Feb. 9, 1937 |
| 2,113,291 | Clark et al. | Apr. 5, 1938 |
| 2,323,519 | Dean | July 6, 1943 |
| 2,376,937 | Pierotti | May 29, 1945 |
| 2,530,241 | Harrington | Nov. 14, 1950 |